(No Model.)
H. B. CORNISH.
COFFEE POT.
No. 377,514. Patented Feb. 7, 1888.
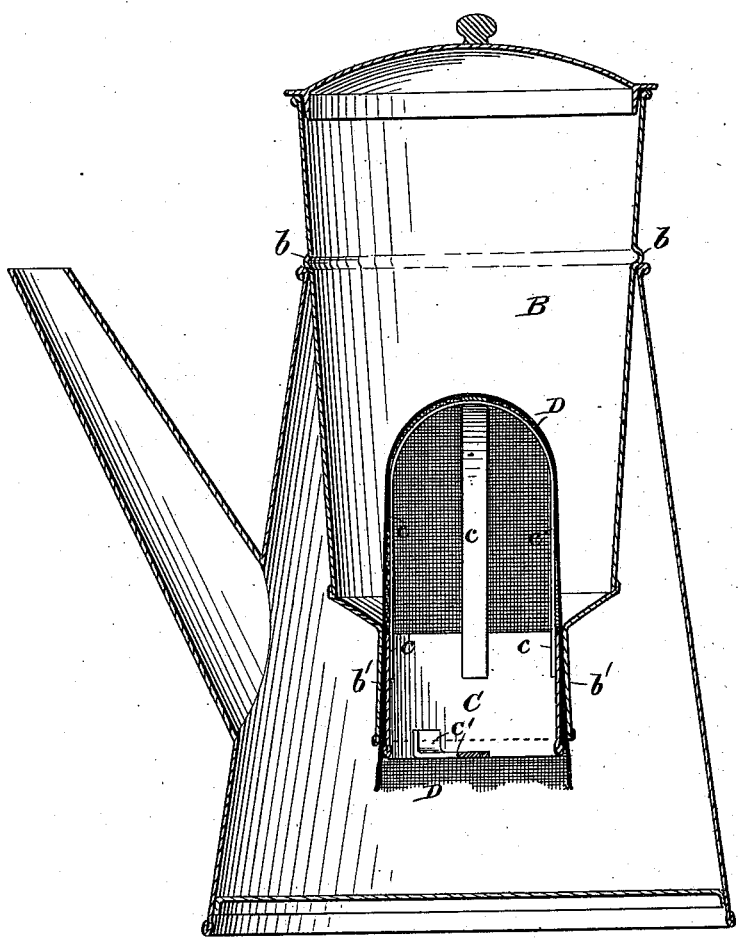
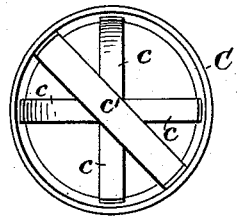
WITNESSES:
J. A. Garfield
C. Sedgwick
INVENTOR:
H. B. Cornish
BY Munn & Co.
ATTORNEYS.

UNITED STATES PATENT OFFICE.

HARRY B. CORNISH, OF BLUE EARTH CITY, MINNESOTA.

COFFEE-POT.

SPECIFICATION forming part of Letters Patent No. 377,514, dated February 7, 1888.

Application filed April 26, 1887. Serial No. 236,201. (No model.)

*To all whom it may concern:*

Be it known that I, HARRY B. CORNISH, of Blue Earth City, in the county of Faribault and State of Minnesota, have invented a new and Improved Coffee-Pot, of which the following is a full, clear, and exact description.

The invention relates to the class of coffee-pots provided with an inner vessel for containing the ground coffee, and into which inner vessel the boiling water is poured and allowed to percolate through the coffee and a strainer and into the main outer vessel; and the object of the invention is to improve the construction of coffee-pots of this character.

The invention consists of details of construction and combinations of parts, as will be hereinafter described and claimed.

Reference is to be had to the accompanying drawings, forming a part of this specification, in which similar letters of reference indicate corresponding parts in both the figures.

Figure 1 is a central vertical sectional elevation of a coffee-pot embodying my invention. Fig. 2 is an inverted plan view of the device for clamping and distending the straining fabric.

In the main outer vessel, A, of the usual or any approved form, is seated the bottomless infusion-vessel B, an annular bead, $b$, thereon, resting on the mouth of said outer vessel.

The infusion-vessel B is formed at its lower end with a downwardly-extending neck, $b'$, the said neck $b'$ being of slightly conical form, flaring outwardly from the vessel B.

In the conical neck $b'$ fits tightly the ring C, carrying the upwardly-projecting bowed arms $c$, that cross each other at the top. The straining fabric D is clamped between the ring C and the conical neck $b'$ of vessel B, the arms $c$, secured to said ring, serving to distend the fabric within vessel B. The ring C is also provided at the bottom with a cross-bar, $c'$, which forms a ready means of inserting the said ring in the neck $b'$ of vessel B and for the removal of the ring therefrom.

The several parts of the coffee-pot may be readily put together for use and as readily taken apart to be cleaned.

It will be noticed that the vessel B tapers toward its lower end, while its conical neck is arranged just the opposite to this, so that when the straining-frame is inserted in the vessel B there will be a space between said frame and the vessel, the width of the space increasing with the height of the strainer, so that the entire straining-surface will be exposed. I am aware that a straining-frame composed of a ring and bowed wires is not of itself new, and hence do not claim the same, broadly.

Having thus described my invention, what I claim as new, and desire to secure by Letters Patent, is—

1. The combination, with the outer vessel, A, of the inner vessel, B, having a cover at its upper end and a conical neck, $b'$, at its lower end, the diameter of the neck being greatest at its lowest end, the strainer-frame $c\ c$, passed upward through the neck into the vessel B, and the fabric D upon the said frame, a coffee-receiving space being formed between the inner side of the vessel and the strainer, substantially as set forth.

2. The combination, with the inner vessel tapering toward its lower end and the neck $b'$, leading from the smaller end of the said vessel and of greatest diameter at its lower end, of the straining-frame comprising the ring C, passed upward into the neck and provided with upward-extending bowed arms $c$, entering the vessel, and with the cross-bar $c'$, substantially as set forth.

HARRY B. CORNISH.

Witnesses:
A. C. BOALS,
HENRY WHITE.